Oct. 15, 1946.   R. W. LIPP   2,409,290
TOOL GUIDING DEVICE
Filed March 10, 1941   6 Sheets-Sheet 3
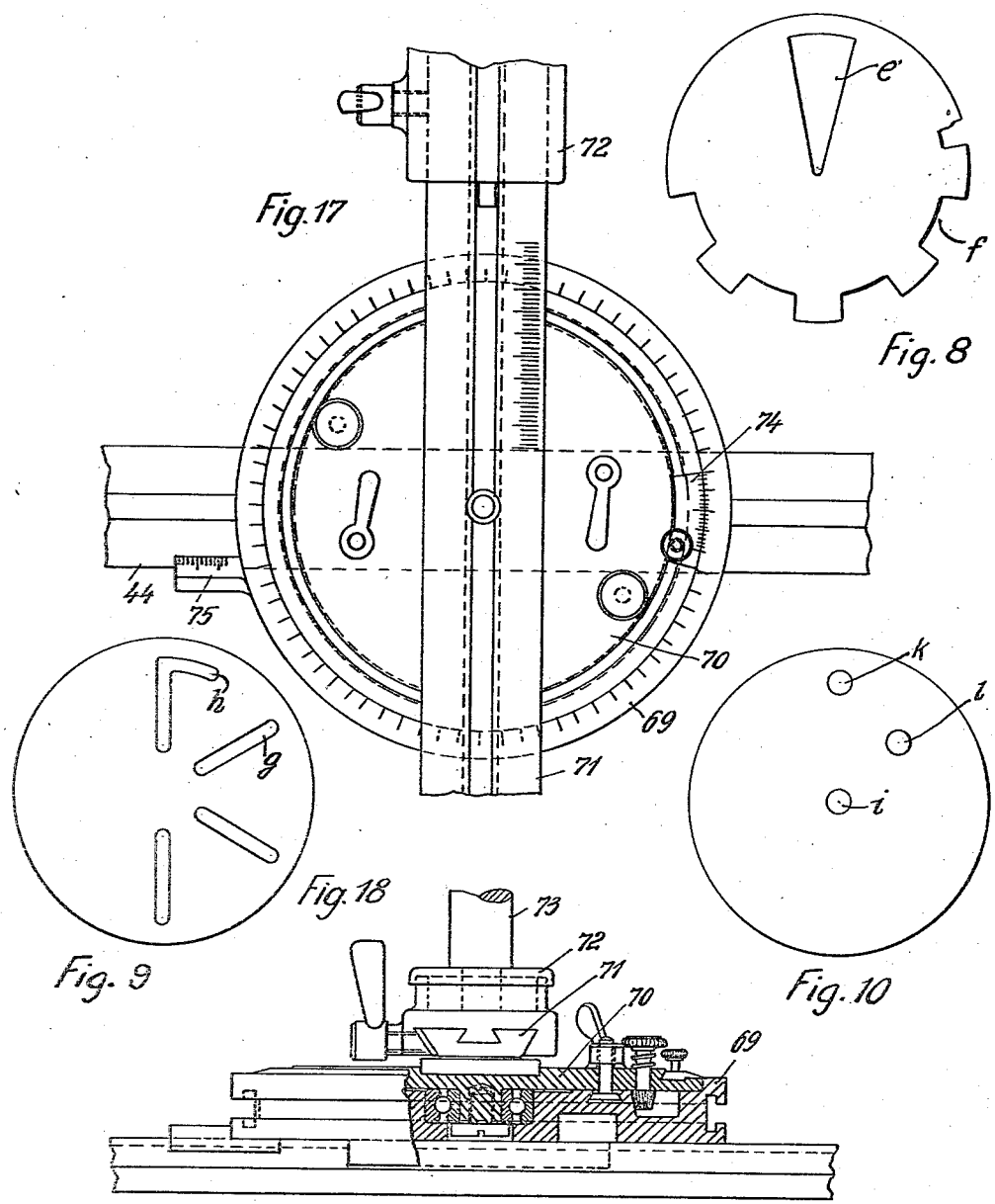

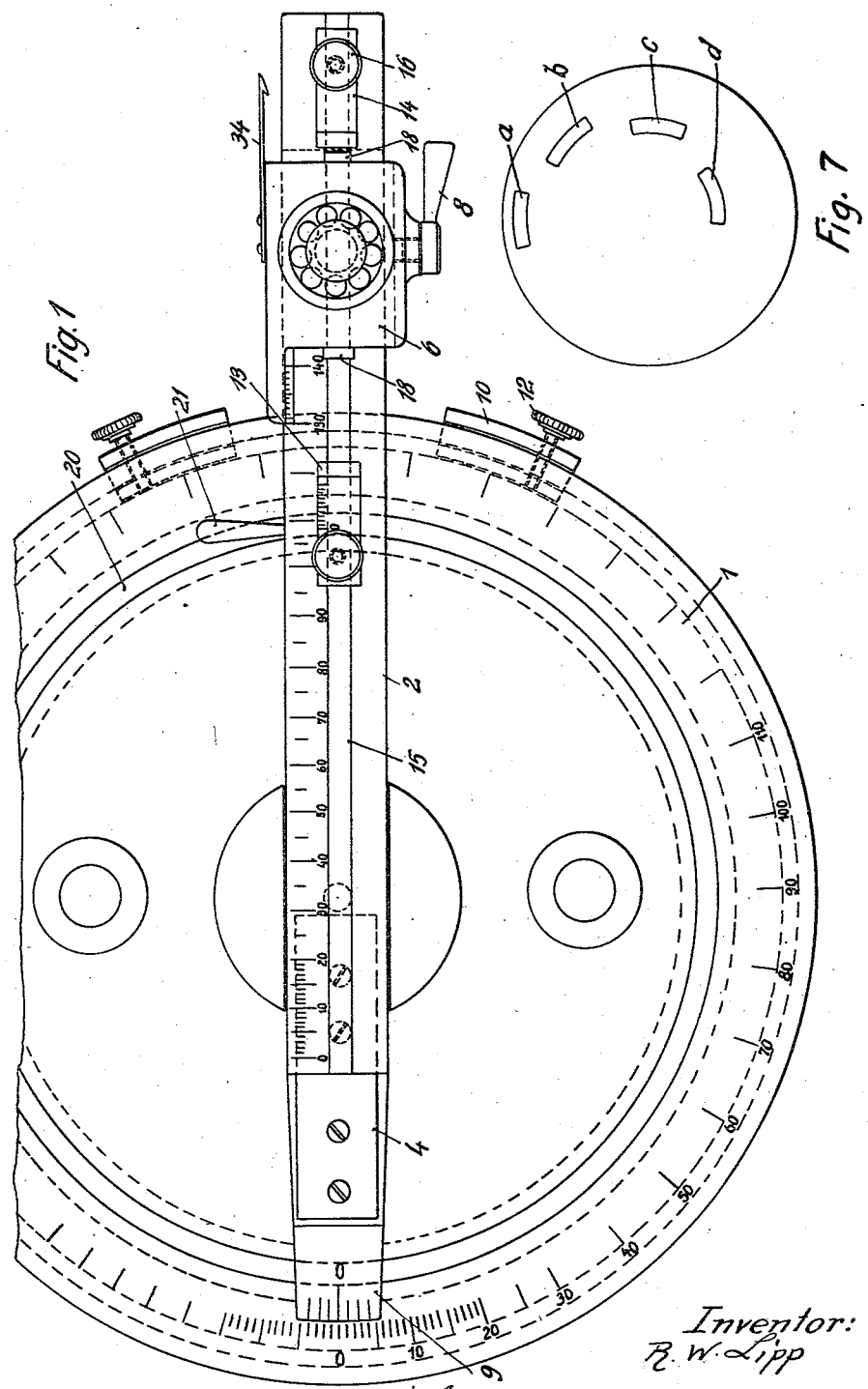

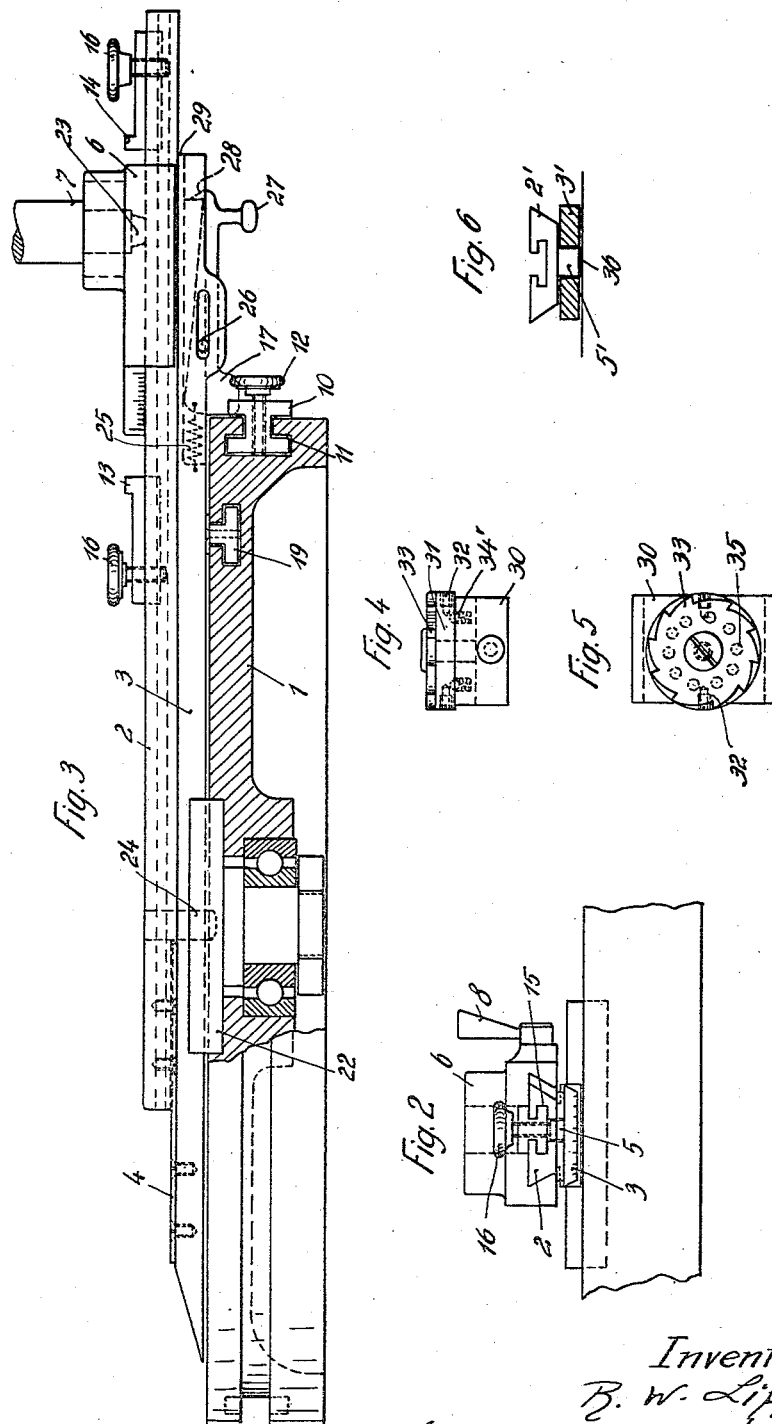

Oct. 15, 1946.   R. W. LIPP   2,409,290
TOOL GUIDING DEVICE
Filed March 10, 1941   6 Sheets-Sheet 4
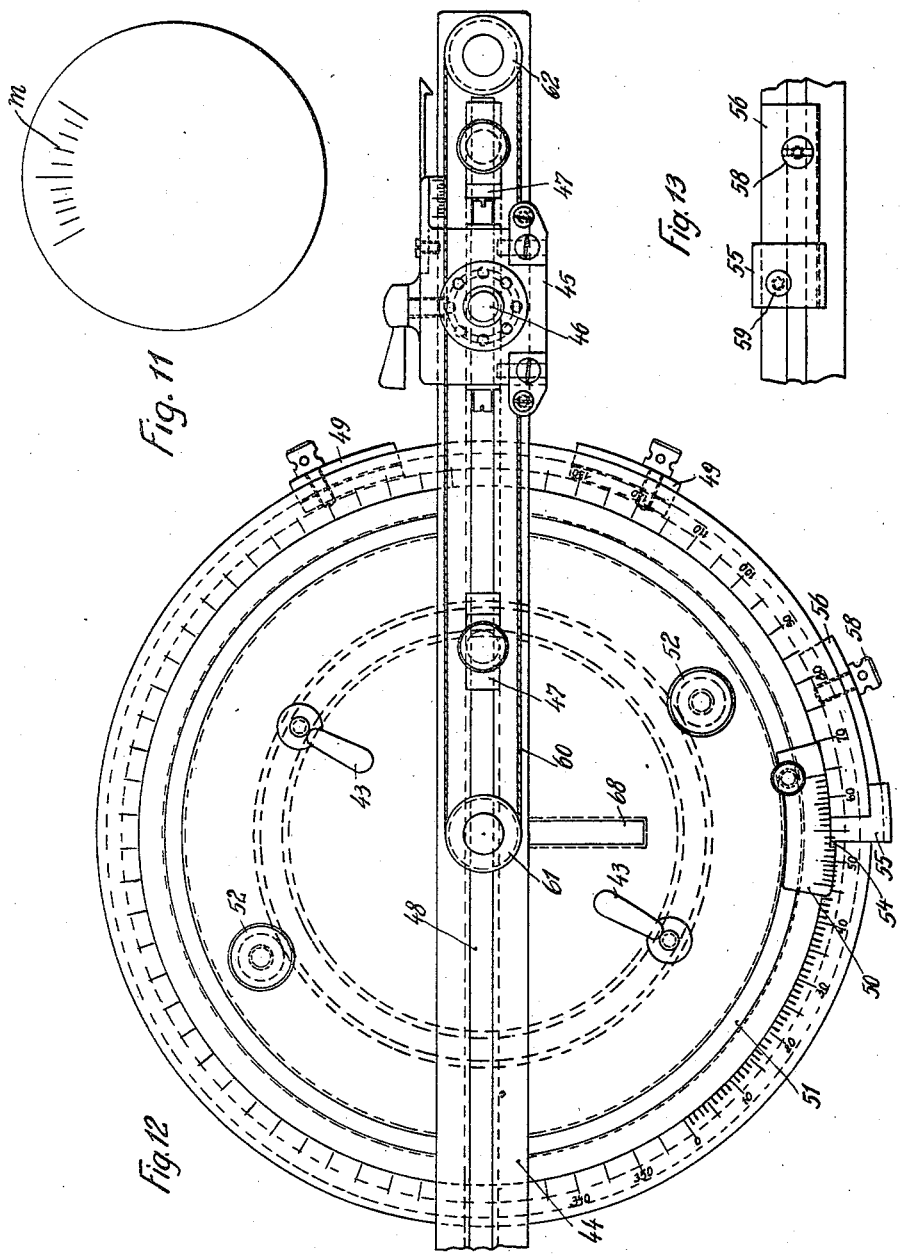

Oct. 15, 1946.　　　　R. W. LIPP　　　　2,409,290
TOOL GUIDING DEVICE
Filed March 10, 1941　　　　6 Sheets-Sheet 5
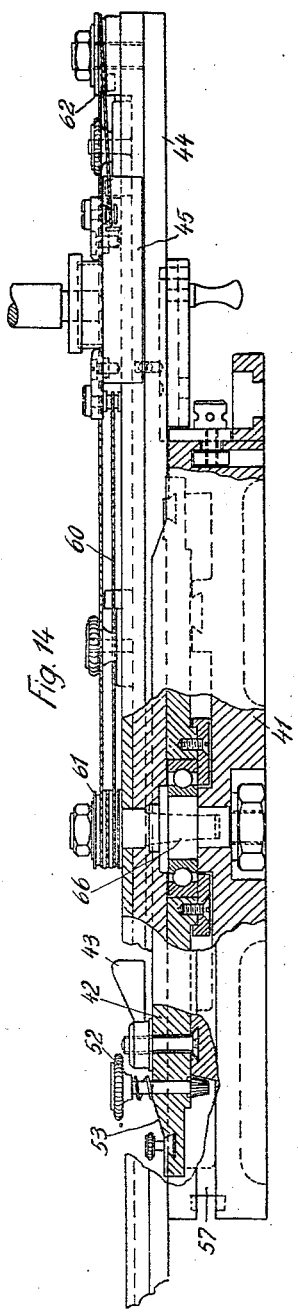
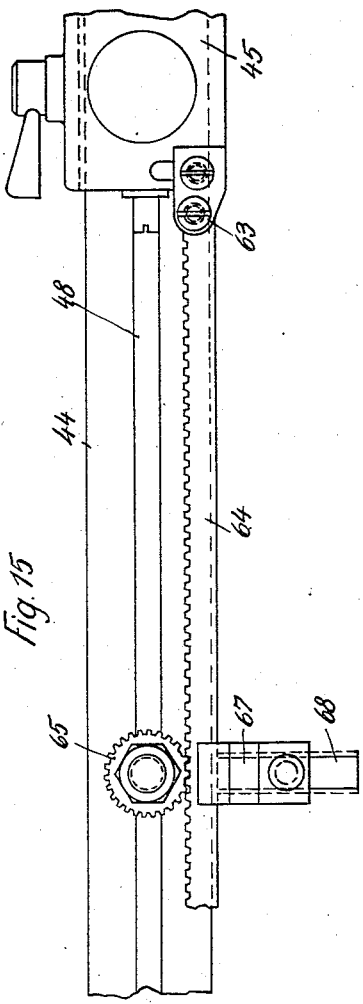
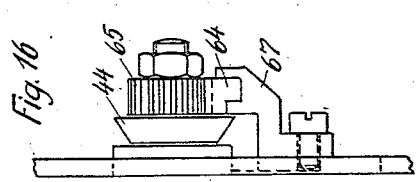
Inventor:
R. W. Lipp
by: Glascock Downing & Seebold
Attys

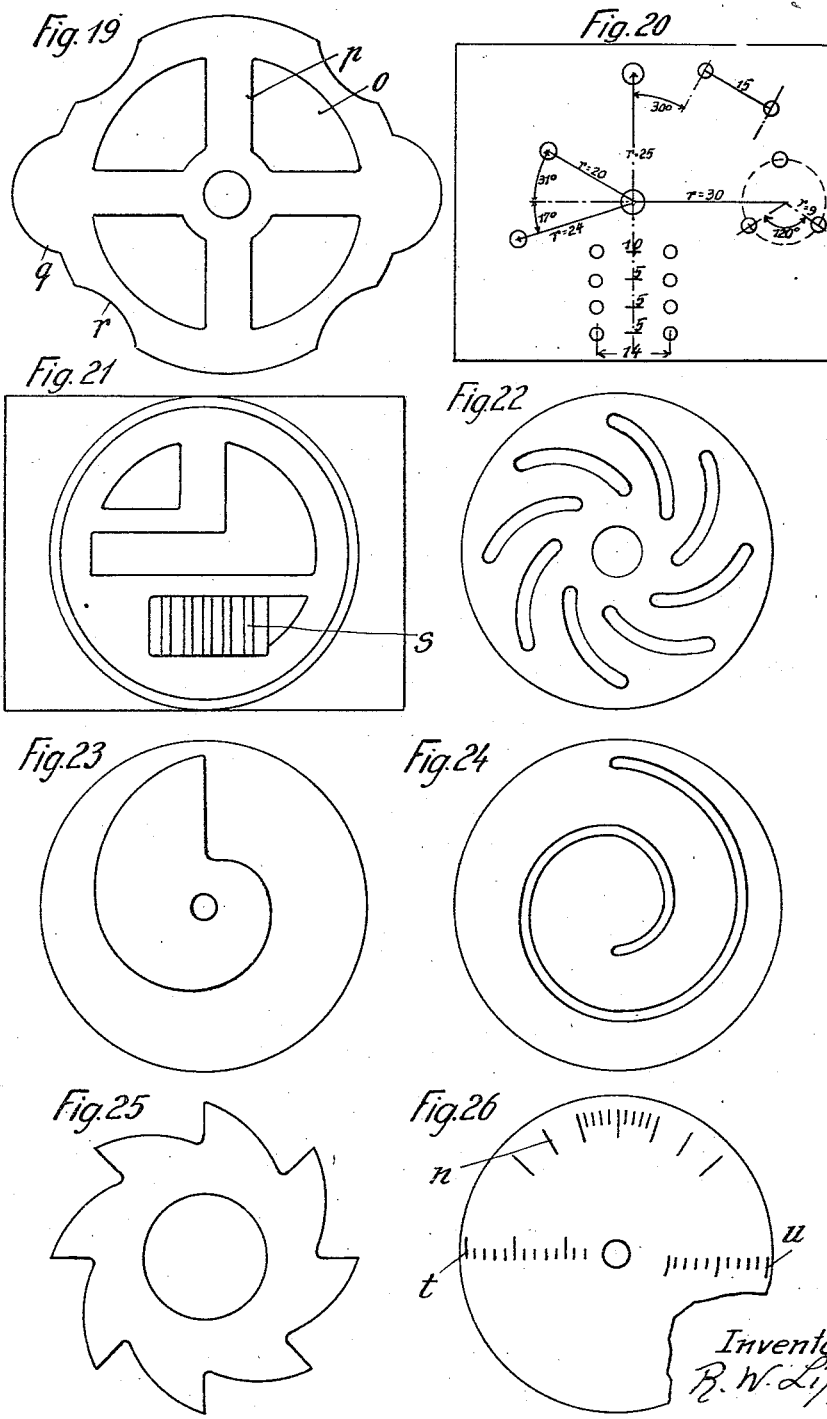

Patented Oct. 15, 1946

2,409,290

UNITED STATES PATENT OFFICE 2,409,290

TOOL GUIDING DEVICE

Rudolf Wilhelm Lipp, Berlin-Pankow, Germany; vested in the Alien Property Custodian Application March 10, 1941, Serial No. 382,644
In Germany March 2, 1940

12 Claims. (Cl. 33—26)

This invention relates to a device for guiding the tool in copying machines, engraving machines, etc.

Machines of this class are operated by causing the tool to follow the outline of a copy or templet and to transmit the outline to the work. As each shaping operation, even in case of slightest deviations, requires a special templet, manufacturing cost is considerably increased thereby, apart from the fact that a divergence in the diameter of the tools frequently renders a stock templet unfit for the purpose aimed at.

The object of the invention is to provide a device by means of which most of the work usually done on such machines can be performed without requiring a plurality of templets.

The device according to the invention is so constructed that the appliance bringing about the transmission is radially and centrally movable relative to the center of the device and may be mounted for instance on a slide moving on a bar rotatable about the axis of the device. Radial motion of the slide is limited by sliding blocks guided in a groove of the bar, and centric motion is limited by other blocks which can be secured in a groove in the surface of the base plate.

The use of the device according to the invention eliminates the disadvantages connected with the prevailing practice and, as explained in detail below, permits the performance of a wide range of work without the aid of the numerous templets hitherto required. It is immaterial whether an appliance like a pantograph for changing the scale is interposed between the device and the tool, since in either case the device may be used with satisfactory results. The device can further be adjusted by simple means. With the aid of scales the limitation for radial and centric motion of the tool can be set according to drawing. If the reading means are provided with a vernier, a sufficient degree of accuracy of adjustment will be insured for most instances, which can be increased still more by employing a pantograph for the transmission of motion. For example, at a transmission ratio of the pantograph of 5:1 and an inaccuracy of $\frac{1}{10}$ mm. in the vernier adjustment the inaccuracy for the tool will amount only to 1/50 mm. If the transmission ratio of the pantograph is higher the working accuracies will, of course, be greater also.

The range of work that can be handled by the device can be considerably widened by extending the bar rotatable about the center of the device beyond the center thereof, so that the radially movable slide can be used on both sides of the center of the device. In this way it becomes possible to perform work extending beyond a center in a single operation without necessitating a change-over and resetting of the device or of the work.

The bar may be secured to a plate rotatably inserted in the base plate of the device, and one of the plates may for instance possess a fine adjustment button that can be brought into engagement with the other plate against spring pressure by a corrugated member.

The circumference of the inner plate may further be provided with a vernier guided in a circular groove and cooperating with a stop displaceably and adjustably arranged in a circumferential groove of the base plate. This arrangement makes it possible to effect angular adjustments over the entire scope of the device requiring the same reading and thereby to dispense with bothersome continual addition or subtraction on the scale of the base plate.

A further improvement provided by the invention consists in securing the slide guided in the bar mentioned to a steel wire, steel band, etc., passed over a stationary roll in the center of the device. When such a device is used, spiral motion is imparted to the tool at centric motion of the bar, the degree of pitch depending upon the diameter of the roll over which the steel band or wire runs and which can be exchanged. The steel wire, etc., is preferably guided in several helical grooves of the roll so as to insure uniform pitch of the spiral. In case of a steel band this effect would be attained only to a certain degree, that is, only for one turn of the band around the roll, since at the second turn the diameter of the roll would be increased to the extent of the thickness of the band. Suitable for the same purpose is further an oscillatable rack attached to the slide and coacting with a stationary toothed wheel provided in the center of the device, in which event the size of the wheel determines the pitch of the spiral. To permit simple and accurate adjustment of the rack and toothed wheel an abutment of the rack acting on the wheel is displaceably and adjustably arranged, so that not only the position of the rack can be adapted in most favorable manner to various sizes of wheels but both the rack and the wheel can be easily disconnected. The coil of steel wire or band, or the toothed wheel, is preferably secured in the centering means substantially comprising a conical bore and provided for this purpose with a threaded bottom.

Another feature of the invention is that the slide guided on the bar may be replaced by an arrangement corresponding to the various types of device mentioned above and supported by the bar. This arrangement in which the appliance provided for transmitting the guiding of the tool is centrically and radially movable is also centrically and radially movable again on the basic device, some examples given below explaining what kind of work may be done with it.

Other features of the invention will be disclosed in the following description with reference to the drawings and in the appended claims.

The invention is illustrated by way of example in the accompanying drawings, in which Figure 1 is a plan of a device according to the invention;

Fig. 2, a side view seen from the front;

Fig. 3, a side view seen from the left;

Figs. 4 and 5 are, respectively, a plan and a side view of an appliance permitting the fixing in radial direction of working paths for the tool which differ in extent and are periodically repeated;

Fig. 6 is a detail view;

Figs. 7 to 11 show examples of work that can be done with the aid of the device according to Fig. 1;

Fig. 12 is a plan of a modified device;

Fig. 13, a side view of a stop cooperating with a vernier;

Fig. 14, a front view of Fig. 12, partly in section;

Fig. 15, a plan of a rack drive for the slide;

Fig. 16, a side view of Fig. 15;

Fig. 17, a plan of an arrangement replacing the slide shown in Fig. 12;

Fig. 18, a front view of Fig. 17, partly in section; and

Figs. 19 to 26 show examples of work performed by a device according to Figs. 12 to 18.

In the construction shown in Figs. 1 to 3 a base plate 1 is provided with a rotatable bar comprising the parts 2, 3 which are interconnected by a leaf spring 4 in such manner that the upper part 2 can be turned up to a certain extent. The spring 4 has a downwardly directed initial tension, so that the upper part 2 always tends to press against the lower part 3. A longitudinal groove and a key 5 are disposed near the circumference of the base plate 1 to prevent relative displacement of the parts 2, 3.

On the bar 2 a slide 6 is provided which takes up a guide pin 7 of the transmitting appliance, e. g. a pantograph, for the tool. The slide 6 can be longitudinally moved on the part 2 and fixed in position by means of a handle 8.

The device is secured to a machine tool like a templet and adjusted in accordance with the working drawing, i. e., for an angular measure with the aid of the scale on the base plate 1 and of the vernier scale on the pointer 9 and for a radial longitudinal measure by means of the scale on the upper part 2 and of the vernier on the slide 6. The end positions for rotating the bar 2, 3 about the axis of the base plate 1 are fixed by blocks 10 guided in a T-groove 11 on the circumference of the base plate 1 and fixable by screws 12. The end positions of the slide 6 are fixed by blocks 13, 14 guided in a T-groove 15 and fixable by screws 16. To adjust the blocks the bar 2, 3 or the slide 6 is first set with the aid of the scales, whereupon the blocks are pushed against a stop 17 of the part 3, or the stops 18 of the slide 6, and clamped in position. Operation of the device would thus start from a fixed end position to cut for instance first an outer circular arc while the slide 6 is clamped on the bar 2, 3 by means of the handle 8. At the end of the arc the handle 8 would be released and the bar 2, 3 fixed by its clamping means 19 which is movable in an annular T-slot 20 and fixable by an eccentric with the aid of a handle 21. Then the slide 6 would be moved in the longitudinal direction of the bar 2, 3 and thus effect radial guiding of the tool on the work, whereupon in corresponding manner, after release of the handle 21, an inner circular arc and then again a radial longitudinal motion with the tool could be executed.

In most cases it will be sufficient to center the device and the work merely by means of the scale on the part 2 and of the vernier of the slide 6, which can be done simply by placing the slide in the zero position of the scale of the bar 2. At this position the tool should be in the center of the work. However, to eliminate sources of error in the vernier adjustment and to provide for still greater accuracy a bore 23, 24 is disposed in the slide 6, the bar 2, 3 and the axial member 22. In centering with the use of this bore the procedure would be such as to remove the guide pin 7 from the slide 6, move the slide 6 in the center of the device and then insert a conical pin in the bore 23, 24, which corresponds to the conical form of the latter. In this way perfect centering is insured if the conical pin is removed and replaced again by the guide pin 7.

Any number of blocks 10 may be distributed over the circumference of the base plate 1 to fix the various working positions for the bar 2, 3. To keep the blocks 10 with their screws 12 out of the way at a centric motion of the bar in such a case the stop 17 is radially displaceable against the pull of the spring 25. For this purpose the stop 17 is guided by a cross pin 26 in a slotted hole of the lower part of the bar 3 and has a handle 27 near which a nose 28 is arranged which when the stop is drawn back automatically engages the rear edge 29 of the bar 3 and secures the stop in this position. While the stop 17 is in withdrawn position the bar 2, 3 can be moved over the blocks 10 or their fixing screws 12. After a block 10 has been bridged over the nose 28 is brought out of engagement with the edge 29 and the stop 17 is returned into working position due to the action of the spring 25.

Figs. 4 and 5 illustrate an appliance permitting the fixing in radial direction of working paths for the tool which differ in extent and are periodically repeated. This appliance can replace the block 13 or 14 or both and comprises a lower part 30 secured to the bar 2 and supporting a rotatable cylindrical member 31 in which several adjustable headless screws 32 are arranged and which is connected with a ratchet wheel 33 operated by a pawl 34, Fig. 1, and disposed on the slide 6. The different relative adjustments of the members 30, 31 corresponding to the number of teeth of the wheel 33 are secured by elastic ball locking means 34' of which one or more may be used to engage corresponding depressions 35.

While operating with the appliance described one makes use of the various adjustable headless screws 32 as stops for the slide 6, though the circumferential area of the cylindrical member 31, alternately with the screws 32, may also serve a stop for the slide.

In case of engraving machines, which operate much more rapidly than copying machines and in which not the same high working forces occur, it is not necessary always to use the clamping means actuated by the handle 21 for fixing the bar 2, 3, since a relatively slight friction between the bar 2, 3 and the base plate 1 will suffice to lock the adjustment during operation. An example is shown in Fig. 6, in which the upper bar portion 2' is provided with a key 5' projecting into a longitudinal groove of the lower bar part 3' and having on its underside a rubber coating 36. In this construction a slight centric motion of the bar occurs when the upper part 2' is lifted, and the friction exerted by the rubber covering 36 upon the base plate 1 suffices for securing the members in working position. The necessary frictional force is produced not only by the weight of the lower bar member 2' but also by the leaf spring 4.

Figs. 1 to 3 show a device that can be universally applied to copying machines, engraving machines, etc., and may be provided also with the arrangement shown in Fig. 6. In devices intended solely for heavier copying work the bar need not be divided into the upper and lower parts 2, 3 but may be made in one piece.

Figs. 7 to 11 show a few examples of the kind of work that can be done with the aid of a device according to the invention. It need hardly be pointed out that the rounding-off radii of the outlines produced depend upon the diameter of the tool used and in this respect the drawings are merely diagrammatic.

The disc shown in Fig. 7 possesses apertures $a$, $b$, $c$, $d$ disposed at different angles and on different radii. The apertures can be produced in the manner described above by adjusting the device for each aperture. It is further possible to set the device for repetition work by employing several blocks 19 and using the appliance shown in Figs. 4 and 5.

The disc of Fig. 8 has a triangular clearance $e$ in the production of which the slide 6 carries out two radial motions at the prescribed angle and only one centric motion for the outer curve. The circumference of the disc possesses notches $f$ which may also be produced by means of the device and have any desired shape by varying their depth and length.

The tool shown in Fig. 9 is provided with radial slots $g$ of a certain pitch, some of which having centric limitations $h$. In this instance, too, the pitch, the length and the general arrangement of the slots may be chosen at will.

Fig. 10 shows different bores. The bore $i$ lies in the center and the bore $k$ on a radius at a prescribed distance from $i$ while a bore $l$ is disposed at a given angle at another distance from the center. This example indicates that the device can be used also in the manner of a jig boring machine.

Fig. 11 gives an example of work done on an engraving machine. A scale $m$ provided with longer and shorter graduation lines is made with the aid of the device according to Figs. 4 and 5, the number of teeth of the pawl-operated ratchet wheel 33 corresponding to the prescribed division and the adjustment of the screws 32 determining the difference in the length of the lines. In producing the sample shown in Fig. 11 only a single appliance has been used instead of the block 14. If the block 13 had also been replaced by an appliance it would have been possible to obtain also differences in the length of the graduation lines toward the center.

In the base plate 41 of the device shown in Figs. 12 and 14 the plate 42 is rotatably inserted which can be locked in position relative to the base 41 by means of tommy-screws 43. The plate 42 is firmly connected with a bar 44 extending to the right and left of the pivot of the device and supporting a slide 45 with receiving means 46 for the guide pin of the transmitting appliance, e. g. a pantograph. For the radial movement of the slide 45 blocks 47 can be displaced and fixed in a groove 48, and centric motion can be limited by blocks 49 fixably guided in a circumferential groove of the base plate 41. For angular adjustment a vernier 50 is displaceably and fixably disposed in an annular groove of the plate 42 and associated with a scale on the circumference of the base plate 41. For fine angular adjustment serve knurled pins 52 provided at their lower end with a conical roller which at the depression of the pins 52 against the action of a spring 53 come into engagement with a conical edge of the disc 41.

The vernier 50 has a stop 54 against which the block 55 abuts displaceably arranged on a stop 56 which can be locked in a circumferential groove 57 of the base 41 by means of a screw 58 while the block 55 is fixable on the stop 56 by a screw 59. In this way equal angles may be continually and successively adjusted without necessitating the solving of addition or subtraction problems, since it is only required, after each angular adjustment, to displace the vernier 50 relative to the block 55 or the graduation of the base plate 41 and then, after loosening of the screw 58, to move the stop 56 until the block 55 strikes the stop 54, whereupon the bar 44 is always moved in the same manner up to the limitation by the stop 56. An example of this is shown at $n$ in Fig. 26.

To the slide 45 a steel wire 60 is secured which passes over the triple groove of the disc 61 stationarily disposed in the base plate 41 at the pivot of the device and over the guide sheave 62 at one end of the bar 44 back to the rear side of the slide 45. At a counter-clockwise centric motion of the bar 44 the slide 45 is uniformly moved to the pivot of the device in accordance with the diameter of the disc 61, and the receiving means 46 for the guide pin describes therefore a spiral of uniform pitch which is transmitted to the tool. It is advisable to provide the steel wire 60 with double guiding as shown so as to insure guiding without play for the slide 45. It would be possible of course to attach the steel wire 60 also to the disc 61 in suitable manner, in which case means would be required, however, to keep the wire uniformly tensioned at each motion during operation.

Similar work may be performed if a rack guide shown in Figs. 15 and 16 is used instead of the steel wire guide just described. At the slide 45 at 63 a rack 64 is oscillatably secured which engages a toothed wheel 65. The wheel 65 and the above-mentioned disc 61 are secured by screws to the centering device 66 serving for centering the device and the work. The abutment for the rack 64 is formed by a gripper 67 displaceably and fixably disposed in a groove 68. By means of this gripper the rack 64 and the toothed wheel 66 can be accurately adjusted; after loosening of the member 67 the rack 64 can be swung about the pivot 63 to disengage the rack gearing. In this way the adjustment of the rack 64 can also be easily adapted to the various diameters of the toothed wheels 65 at changing pitch of the spiral.

Figs. 17 and 18 show an appliance which substantially conforms to the device shown in Figs.

1 and 3 and 12 and 14. The appliance is intended to be displaceably arranged on the bar 44 instead of the slide 45. Like the basic device it comprises a base plate 69 in which a plate 70 is rotatably inserted which supports a bar 71 on which a slide 72 is arranged, the slide 72 possessing in this instance the receiving means for the guide pin 73 of the transmitting means between the device and the tool. The other parts of this attachment correspond to the parts of the basic arrangement described. The bar 71 and the slide 72 are provided with adjusting and reading scales as in the basic arrangement, and the same applies to the plates 69 and 70 and the adjustable vernier 74 associated with the plate 70. The base plate 69 is further equipped with reading means 75 cooperating with a corresponding scale of the bar 44.

The constructions shown in Figs. 12 to 18 can be used for performing a wide range of work. Besides the work shown in Figs. 7 to 11 other work of the kind illustrated for instance in Figs. 19 to 26 may be carried out.

Fig. 19 shows a disc provided with openings $o$ to produce the spokes $p$, and the circumference of the disc possesses further outwardly and inwardly directed circular arcs $q$, $r$. For this kind of work a device according to Figs. 17 and 18 is employed, and in order to produce the spokes $p$ the slide 72 is fixed at half the width of the spoke outside the pivot of the device, whereupon the device in this position is moved on the bar 44 parallel to the corresponding radius. To produce the circular arcs $q$, $r$ the pivot of the disc 70 is set to the center of the arc to be produced, and the slide 72 is then caused to describe the desired circular arc. Fig. 20 shows an example of boring mill work which indicates that the device is capable of producing bores according to any drawing data. In the plate shown in Fig. 21 clearances or depressions are provided whose straight lines extend parallel to any desired radius while, moreover, in one of the depressions or clearances parallel ribs $s$ have been left standing. Figs. 19 to 21 show that the device according to Figs. 17 and 18 can be used not only for carrying out radial and centric motions of the tool relative to the center of the work but also for performing any desired other motions, rectilinear or circular, in so far as these lines can be graphically determined.

The pieces of work shown in Figs. 22 to 25 have spirally extending working outlines. In Fig. 22 a plurality of short spiral grooves distributed at the same angle over the work are shown. Fig. 23 shows a spiral cam disc; Fig. 24, a spiral groove; and Fig. 25, a ratchet wheel the backs of whose teeth extend in the form of a spiral. When these spirals have the form of circular arcs or compound circular arcs, the curves can be made with the aid of the appliance shown in Figs. 17 and 18 and to be used in conformity with Figs. 19 and 20. If, on the other hand, spirals of constant lead are concerned the center of which lies in the center of the work, a device provided with a steel wire or band and shown in Figs. 12 and 14 or with a rack drive as shown in Figs. 15 and 16 is employed. In case of spirals with uniform lead whose center lies outside the center of the work a device according to Figs. 17 and 18 is used which is additionally provided with a steel wire or rack guide according to Figs. 12, 14 or 15, 16.

Fig. 26 shows a graduated disc on which several possibilities with respect to scales are indicated of which the scale $n$ has already been mentioned before. The scale $t$ is preferably produced by means of a device according to Figs. 4 and 5, which is secured to a stop block of the slide 72. To execute the scale $u$ the device shown in Figs. 4, 5 is placed on a stop block 49 according to Fig. 12.

The examples shown do not exhaust the possibilities afforded by the invention and are intended merely to give an idea of the wide range of uses of the device covered thereby.

What is claimed is:

1. A device for guiding the tool in copying machines, engraving machines and the like, comprising a base, a bar rotatable about an axis on said base, adjustable stops on said base, and a slide for guiding the tool and radially adjustable on said bar, said bar being adjustable centrically of said axis between said stops.

2. A device according to claim 1, characterized by the feature that the bar is fixable in any adjusted position between said stops by a clamping means.

3. A device according to claim 1, characterized by the feature that the bar comprises upper and lower parts, the upper part being provided with a key which engages and extends through a longitudinal groove of the lower part and is arranged to be disengaged from said longitudinal groove, the underside of said key being provided with a rubber covering which contacts with the base when the key extends through the groove.

4. A device according to claim 1, characterized by the feature that the bar comprises upper and lower parts, the upper part being provided with a key which engages and extends through a longitudinal groove of the lower part and is arranged to be disengaged from said longitudinal groove, the underside of said key being provided with a rubber covering which contacts with the base when the key extends through said groove, a leaf spring secured at one end to the upper part, and at the opposite end to the lower part and extending freely along the lower part to ensure the mobility of the upper part relative to the lower part and also to exert a downwardly directed pressure on the upper part.

5. A device according to claim 1, characterized by the provision of a spring-pressed stop member arranged on the bar and effective during the centric movement to engage the adjustable stops, said stop member being movable from engagement with the adjustable stops against said spring pressure, and means for retaining the stop member in the disengaged position.

6. A device according to claim 1, characterized by the feature that the radial movement of the slide is limited by a stop device on said bar comprising adjustable stops provided in a rotatable disk connected to a ratchet wheel which is driven by a pawl secured to the slide.

7. A device according to claim 1, characterized by the feature that the base has a central bore which together with a corresponding bore of the slide serves as centering device when clamping the workpiece to be machined.

8. A device according to claim 1, characterized in that the bar is secured on a plate which is rotatably inserted in the base and that the bar is of such a length that the slide can be used on both sides of the center of the device.

9. A device according to claim 1, characterized in that the bar is secured on a plate which is rotatably inserted in the base and that the bar is of such a length that the slide can be used on both sides of the center of the device, a fine adjustment button in the inserted plate being provided with a conical knurled part, which can be brought into engagement against spring pressure with a corresponding conical centric edge of the base.

10. A device according to claim 1, characterized in that the bar is secured on a plate which is rotatably inserted in the base and that the bar is of such a length that the slide can be used on both sides of the center of the device, a vernier guided on the circumference of the inserted plate in a circular groove being provided with a stop and coacting with a stop displaceable and adjustable in a circumferential groove of the base.

11. A device according to claim 1, characterized in that the bar is secured on a plate which is rotatably inserted in the base and that the bar is of such a length that the slide can be used on both sides of the center of the device, the slide guided in the bar being attached to a steel wire passed over a roll fixed in the center of the device.

12. A device according to claim 1, characterized in that the bar is secured on a plate which is rotatably inserted in the base and that the bar is of such a length that the slide can be used on both sides of the center of the device, a rack connected to the slide cooperating with a toothed wheel stationarily disposed in the center of the device, the oscillatable rack bearing against an abutment adjustable and displaceable in the center of the device.

RUDOLF WILHELM LIPP.